United States Patent [19]
Abe

[11] Patent Number: 4,924,832
[45] Date of Patent: May 15, 1990

[54] SYSTEM AND METHOD FOR CONTROLLING IGNITION TIMING FOR INTERNAL COMBUSTION ENGINE

[75] Inventor: Toshiro Abe, Tokyo, Japan
[73] Assignee: Nissan Motor Company, Limited, Yokohama, Japan
[21] Appl. No.: 343,336
[22] Filed: Apr. 26, 1989

[30] Foreign Application Priority Data

Apr. 26, 1988 [JP] Japan .................. 63-105093

[51] Int. Cl.⁵ .................. F02D 41/04; F02D 41/26; F02P 5/15
[52] U.S. Cl. .................................. 123/419; 123/436; 123/422; 74/860
[58] Field of Search .............. 123/417, 419, 422, 423, 123/436; 74/859, 860; 364/431.08

[56] References Cited

U.S. PATENT DOCUMENTS

| | | | |
|---|---|---|---|
| 4,329,960 | 5/1982 | Woodhouse et al. | 123/419 X |
| 4,395,984 | 8/1983 | Yamaguchi et al. | 123/325 |
| 4,407,259 | 10/1983 | Abo | 123/620 |
| 4,423,714 | 1/1984 | Hayashi | 123/422 X |
| 4,713,763 | 12/1987 | Hofmann | 74/860 X |
| 4,792,902 | 12/1988 | Hrovat et al. | 123/419 X |
| 4,819,596 | 4/1989 | Yasuoka et al. | 74/860 X |
| 4,852,537 | 8/1989 | Nagano et al. | 123/419 |

FOREIGN PATENT DOCUMENTS

| | | | |
|---|---|---|---|
| 3309947 | 7/1984 | Fed. Rep. of Germany | 123/422 |
| 0168266 | 9/1984 | Japan | 123/422 |
| 0077736 | 3/1989 | Japan | 123/419 |

Primary Examiner—Willis R. Wolfe
Attorney, Agent, or Firm—Foley & Lardner, Schwartz, Jeffery, Schwaab, Mack, Blumenthal & Evans

[57] ABSTRACT

A system and method for controlling an ignition timing for a vehicular internal combustion, are disclosed in which a basic ignition timing is determined on the basis of engine operating conditions, i.e., an engine revolution speed and pulsewidth of a fuel injection signal supplied to an injection valve for each engine cylinder. A first correction quantity to correct the basic ignition timing is determined on the basis of a change rate of the engine revolution speed. A second correction quantity to correct the basic ignition timing is determined on the basis of an engine load. A final ignition timing is determined on the basis of the basic ignition timing and/or first and second correction quantities when the engine falls into a transient operating condition, any one of shift gear positions is detected, the gear shift positions including a position in which no engine driving force is transmitted to a vehicular power train. The final ignition timing is determined according to the gear shift range position. In addition, when the gear shift is placed in the position in which no engine driving force is transmitted to the power train and the change in the engine revolution speed occurs, the basic ignition timing is determined to be the final ignition timing.

20 Claims, 5 Drawing Sheets

BASIC IGNITION TIMING ANGLE
(WIDE ← OPENING ANGLE OF THROTTLE → NARROW)

FIG. 5

BASIC IGNITION TIMING ANGLE

SYSTEM AND METHOD FOR CONTROLLING IGNITION TIMING FOR INTERNAL COMBUSTION ENGINE

BACKGROUND OF THE INVENTION (1) Field of the Invention

The present invention relates to a system and method for controlling ignition timing in an internal combustion engine which are suitable for achieving a smooth increase of engine revolutions during acceleration (deceleration) of a vehicle in which the engine is mounted.

(2) Background of the Art

Various types of engine ignition timing control systems have been proposed in which the ignition timing is controlled so that the engine is driven according to optimum engine operating conditions In such ignition timing control systems, optimum values of the ignition timing are previously stored so as to correspond to input information representing the engine operating conditions and optimum controlled variables are read in accordance with changing engine operating conditions.

For example, an optimum ignition timing angle is derived through experiment or so on, then, a map table is prepared in which the optimum ignition timing angle is determined using the engine revolution speed and injection pulsewidth. The map table is stored in a ROM (Read Only Memory) installed in a control unit constituted by a microcomputer so that when the engine is driven, the values of the engine revolution speed, detected by means of a sensor, and of the injection pulsewidth are calculated in the control unit and are used to read the ignition timing angle value from the table map to execute the ignition timing control.

However, in cases where a transient state occurs such as engine acceleration/deceleration, a control delay occurs as the result of a required value changing abruptly so that the engine revolution speed is not smoothly increased and fluctuations in the engine revolution speed often occur.

Such revolutional fluctuations are transmitted to a power train as torque variations so that low-frequency vibrations are generated in a vehicle body in forward and reverse directions (referred to as surges). Such surges give the vehicle driver an unpleasant feeling of wobbling or shaking with the vehicle body (referred to as shaking or wobbly vibrations) and reduce driveability of the engine.

To prevent such shaking vibrations, the ignition timing needs to be controlled so as to suppress the engine revolution fluctuations. That is to say, when the engine revolutions drop during the occurrence of shaking vibrations, the ignition timing is advanced to increase the engine torque. When the engine revolutional speed is increased, the ignition timing is retarded to decrease the engine torque. Thus, the ignition timing control system causes the supression of revolutional fluctuations and torque variations.

However, the occurrences of the surges and shaking vibrations are changed according to the engine load state. For example, when an engine throttle valve is largely opened, the ignition timing is corrected so that the engine output torque is largely changed but, in a case of a partial load, the change of the engine torque hardly occurs even if the ignition timing is corrected.

With the above-described problem in mind, a Japanese Pat. Application sho No. 62-280922 (which is not yet published) filed on Nov. 9, 1987 discloses an ignition timing control system in which the load state on the engine is taken into account. The ignition timing control system is corrected so as to further suppress the occurrence of shaking vibrations. In detail, when the engine enters a transient state, the ignition timing control system sets a first correction coefficient to correct the ignition timing according to the engine revolution speed and sets a second correction coefficient to correct the ignition timing based on the engine load condition so that the revolutional fluctuations during acceleration are suppressed according to the engine load conditions to prevent occurrence of the shaking vibrations.

However, since the ignition timing control system disclosed in the above-identified Japanese Patent Application corrects the ignition timing on the basis of the engine load and engine revolution speed; when the engine falls in the transient state, the quantity of ignition timing advance angle (or retardation angle quantity) at a time an accelerator pedal is depressed with a transmission gear position placed in a first-speed gear ratio becomes insufficient. When the vehicle driver depresses the accelerator pedal in an engine idling state (i.e., the gear position is in a neutral gear range or the clutch is disengaged), the ignition timing control is continued. Hence, the advance angle quantity becomes excessively increased so that a smooth increase of the engine revolutional speed cannot be felt by the vehicle driver when the vehicle transfers from a stopped state to a running state.

That is to say, since the engine torque at a time when the first-speed gear range is placed is transmitted to the vehicular power train, multiplied by a gear ratio and the vibrations in the engine torque are transmitted as vibration applying forces, an attenuation quantity of the engine torque is reduced due to a normal ignition timing correction so that the shaking vibrations cannot sufficiently be suppressed. In addition, since the engine torque is not transmitted to the vehicular power train when the gear position is placed in the neutral position or when the clutch is disengaged, the corrective control of the ignition timing is not necessary at the time of the vehicle stop and, thereafter, the feeling of smoothly increasing the engine revolution speed cannot be felt by the vehicle driver due to a response delay of the ignition timing control when the engine is transferred into a running state from a vehicle stop in the idling state.

SUMMARY OF THE INVENTION

It is, therefore, an object of the present invention to provide an improved system for controlling an ignition timing system for a vehicular internal combustion engine and method therfor which achieve a smooth increase of engine revolution speeds during acceleration and also prevent occurrence of low-frequency vibrations due to variations in the engine revolutional speeds which vary according to the load state and any one of gear shift positions.

It is another object of the present invention to provide an improved system and method for controlling the ignition timing for the vehicular internal combustion engine which achieve the increased engine driveability.

The above-described objects can be achieved by providing a system for controlling an ignition timing for a vehicular internal combustion engine, comprising: (a) first means for detecting engine operating conditions, the first means including second means for detecting an engine revolutional speed; (b) third means for detecting any one of gear shift positions of a vehicular power transmission, the gear shift positions including a position in which an engine driving force is not transmitted to a vehicular power train; (c) fourth means for determining whether the engine falls into a predetermined transient state on the basis of the engine operating conditions; (d) fifth means for setting a basic ignition timing angle value according to the detected engine operating conditions; (e) sixth means for calculating a first correction coefficient according to an engine revolutional speed variation when the engine falls into the predetermined transient state, the vehicle in which the engine is mounted moving; (f) seventh means for determining an engine load on the basis of the detected engine operating conditions and calculating a second correction coefficient which corrects the ignition timing depending on which of the gear shift positions in which the shift gear is placed and depending on the engine load; (g) eighth means for correcting the basic ignition timing angle value on the basis of the first and second correction coefficients to determine a final ignition timing when the engine is transferred into the predetermined transient state during the vehicle movement, the eighth means halting the correction of the basic ignition timing angle value based on the first and second correction coefficients and determining the basic ignition timing angle as the final ignition timing when the engine does not fall into the predetermined transient state and when the shift gear is placed in the position in which no engine output power is transmitted to the vehicular power train; and (h) ninth means for igniting an air-fuel mixture supplied to each engine cylinder at a timing in accordance with the final ignition timing determined by the eighth means.

The above-described objects can also be achieved by providing a system for controlling an ignition timing for a vehicular internal combustion engine, comprising: (a) means for detecting variables representing an operating condition of the engine, the first means including second means for detecting whether the engine falls into a transient state, third means for detecting occurrence of change in an engine revolutional speed and rate of change in the engine revolution speed, and fourth means for detecting an engine load; (b) fifth means for determining a basic ignition timing on the basis of the variables detected by the first means; (c) sixth means for determining a first correction quantity to correct the basic ignition timing on the basis of the change rate of the engine revolution speed; (d) seventh means for determining a second correction quantity to correct the basic ignition timing on the basis of the engine load; (e) eighth means for determining a final ignition timing on the basis of the basic ignition timing and/or first and second correction quantities when the third means detects the occurrence of the change in the engine revolution speed; (f) ninth means for detecting any one of gear shift positions of a vehicular power transmission, the gear shift positions including a position in which no engine driving force is transmitted to a vehicular power train; (g) tenth means for enabling and disabling the operations of the sixth means and seventh means according to any one of the gear shift positions of the vehicle; and (h) eleventh means for igniting an air-fuel mixture of each engine cylinder at a timing determined by the eighth means.

The above-described objects can also be achieved by providing a method for controlling an ignition timing for a vehicular internal combustion engine, comprising the steps of: (a) detecting an engine revolution speed; (b) detecting a fuel injection pulsewidth supplied to a fuel injection valve installed in an intake air passage of the engine; (c) determining a basic ignition timing on the basis of the fuel injection pulsewidth and engine revolution speed; (d) detecting occurrence of a change in the engine revolution speed and rate of change in the engine revolution speed; (e) detecting an engine load; (f) determining a first correction quantity to correct the basic ignition timing on the basis of the ate of change in the engine revolution speed, (g) determining a second correction quantity to correct the basic ignition timing on the basis of the engine load; (h) determining a final ignition timing on the bass of the basic ignition timing and/or first and second correction quantities; (i) detecting any one of gear shift positions of a vehicular power transmission, the gear shift positions including a position in which no engine driving force is transmitted to a vehicular power train; (j) changing the first and second correction quantities according to any one of the gear shift positions and disabling the operations in the steps (f) and (g) so that the final ignition timing is the basic ignition timing when the gear shift is placed in the position in which no engine driving force is transmitted to the power train; and (k) igniting an air-fuel mixture supplied to each engine cylinder at a timing of the final ignition timing.

BRIEF DESCRIPTION OF THE DRAWINGS

FIGS. 2 (A) and 2 (B) are operational flowcharts on which the ignition timing controlling system in the preferred embodiment according to the present invention is executed.

FIGS. 3 (A) is a table map for deriving correction coefficients of $K_N$ and $K_{N'}$.

FIG. 3 (B) is a characteristic graph representing a correction quantity ($\Delta IGNL$) with respect to a rate of change in an engine revolution speed (dN).

DETAILED DESCRIPTION OF THE PREFERRED EMBODIMENT

Reference will hereinafter be made to the drawings in order to facilitate a better understanding of the present invention.

FIGS. 1 to 5 show a preferred embodiment of an engine ignition timing control system according to the present invention.

Figure 1:
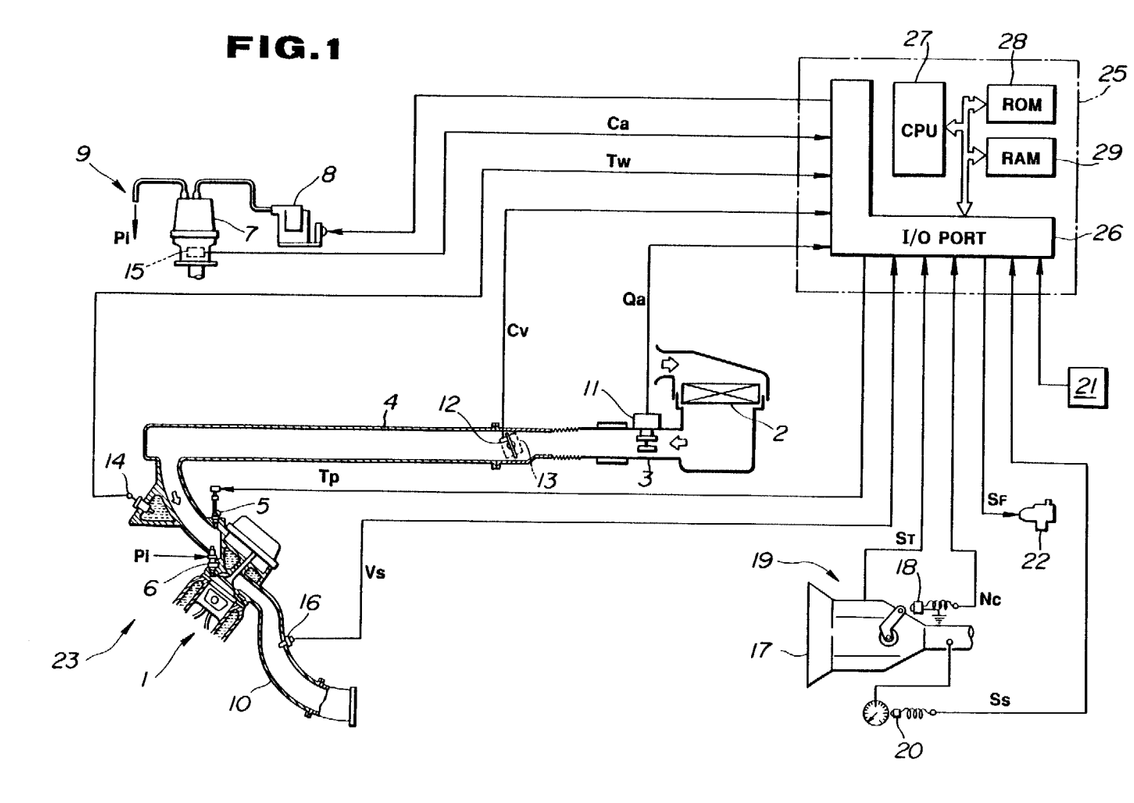
FIG. 1 is a schematic view of an ignition timing controlling system applied to a vehicular internal combustion engine in a preferred embodiment according to the present invention.

In FIG. 1, a vehicular engine 1 includes an air cleaner 2 through which intake air is passed. The intake air is passed through an intake air passage 3 and is supplied to each engine cylinder through an intake manifold 4. Engine fuel is injected through an injection valve 5 and is transferred into each cylinder on the basis of an injection signal $T_p$.

An ignition plug 6 is installed in each cylinder, receiving a high surge voltage $P_i$ from an ignition coil 8 via a distributor 7. These ignition plugs 6, distributor 7, and ignition coil 8 constitute ignition means denoted by 9. The structure of the ignition means 9 is exemplified by a U.S. Pat. No. 4, 407,259 issued on Oct. 4, 1983, the disclosure of which is hereby incorporated by reference.

An intake air quantity $Q_a$ is detected by means of an airflow meter 11 and controlled by means of a throttle valve 12 in the intake air passage 3. An opening angle $C_v$ of the throttle valve 12 is detected by a throttle opening angle sensor 13. A temperature $T_w$ of an engine coolant flowing through a water jacket is detected by means of a water temperature sensor 14. A crank angle Ca of the engine is detected by a crank angle sensor 15 incorporated in the distributor 7. The crank angle sensor 15 produces pulses representing a crank angle Ca provides a basis for the calculation of the engine revolution speed N.

An oxygen concentration $V_s$ in exhaust gas is detected by an oxygen sensor 16 installed in an exhaust pipe 10. A position of a gear shift lever $S_T$ of a vehicular transmission is detected by means of a position sensor 17. A neutral position of the shift lever is detected by a neutral switch 18. The position sensor 17 and neutral switch 18 constitute gear position detecting means 19. A vehicle speed $S_s$ is detected by means of a vehicle speed sensor 20. A clutch switch 21 detects whether the engine torque is transmitted to a vehicular power train and outputs an on or off signal $S_k$. 22 denotes a fuel pump.

Each signal $Q_a$, $C_v$, $T_w$, $C_a$, $V_s$, and $S_s$ is inputted into an I/O Port 26 in a control unit 25 which is constituted by a microcomputer. The microcomputer includes a CPU (Central Processing Unit) 27, ROM (Read Only Memory) 28, RAM (Random Access Memory) 29 in addition to the I/O Port 26. The CPU 27 retrieves external data required for control of ignition timing as will be described later and executes a data transfer with the RAM 29. The CPU 27 outputs an ignition timing signal $S_{IGN}$ on the basis of the calculated ignition timing to the ignition means via the I/O Port 26.

Figure 2:
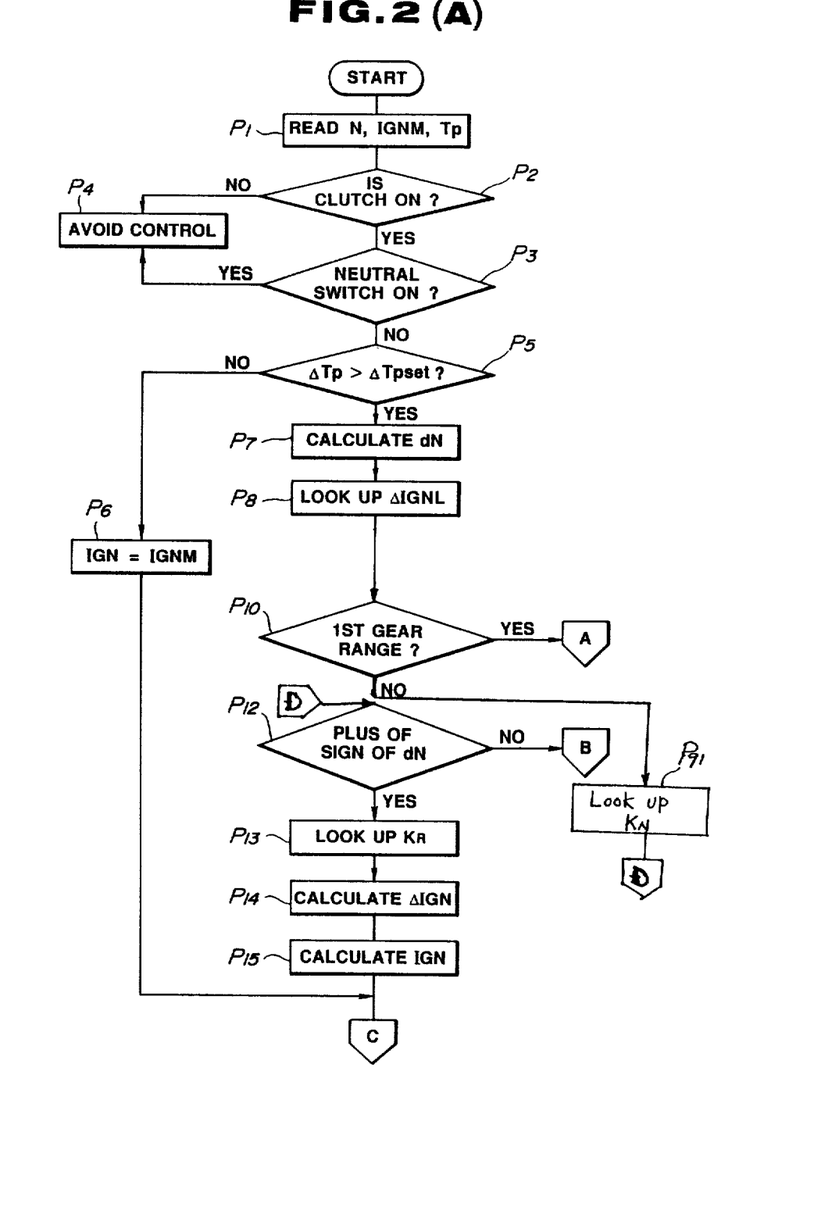

FIGS. 2 (A) and 2 (B) are an integrated flowchart on which the CPU 27 executes the ignition timing controlling operation.

The routine shown in FIGS. 2 (A) and 2 (B) is executed for each predetermined period of time.

In a step $P_1$, the CPU 27 reads a basic ignition timing IGNM, an injection pulsewidth $T_p$, and revolution speed N.

The basic ignition timing IGNM is looked up from a table map having parameters N and $T_p$. The table map is prepared through an experiment and stored in the ROM 28. The injection pulse $T_p$ as one of the parameters of the table map may be replaced with the intake air quantity $Q_a$ or opening angle $C_v$ of the throttle valve.

In steps $P_2$ and $P_3$, the CPU 27 determines whether the vehicle is driven or stopped from the on-or-off state of the neutral switch 18 and clutch switch 21. During the drive of the vehicle, the routine goes to a step $P_5$ and subsequent steps but goes to a step $P_4$ when the vehicle stops to halt the advance of the program. That is to say, during the avoidance of a corrective ignition timing control, the ignition timing is controlled so that the basic ignition timing IGNM serves as the final ignition timing IGN.

If the vehicle is moving, the routine goes to a step $p_5$ in which a change of the injection pulsewidth $\Delta T_p$ over time is compared with a basic value $\Delta T_{pset}$ of the injection pulsewidth per time to determine whether the vehicle is being accelerated (transient state). The injection pulsewidth is exemplified by a U.S. Pat. No. 4,395,984 issued on Aug. 2, 1983, the disclosure of which is hereby incorporated by reference.

If the vehicle is not in acceleration state, the routine goes to a step $p_6$ in which the final ignition timing IGN serves as the basic ignition timing IGNM. In a step $P_{25}$, the final ignition timing IGN is stored in a predetermined address of the RAM 29. Thereafter, the ignition signal $S_{IGN}$ is outputted from the I/O Port 26 to an ignition coil 8. A high voltage pulse $P_i$ is outputted to one of the ignition plugs 6 to ignite and burn air-fuel mixture sucked into a corresponding cylinder via the distributor 7.

On the other hand, if the vehicle is in acceleration state, the routine goes to the step $P_7$ in which a change quantity dN of the engine revolution speed N is calculated on the basis of the change in the crank angle $C_a$.

Figure 3A:
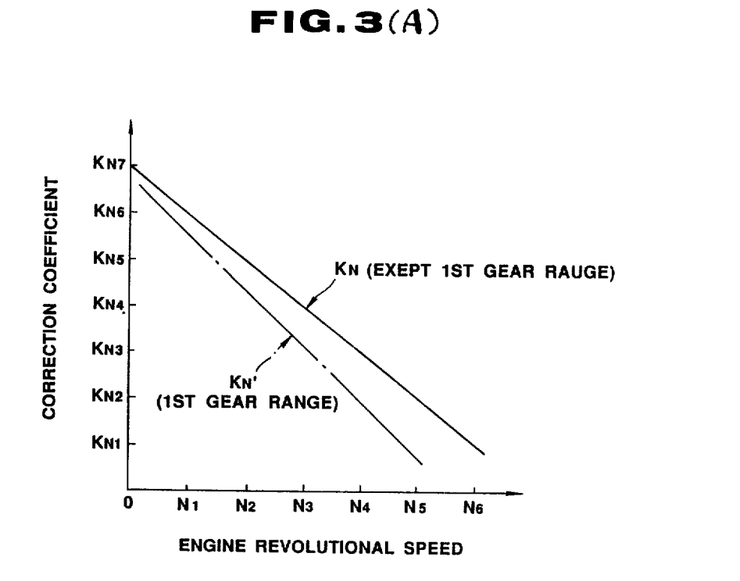
Figure 3B:
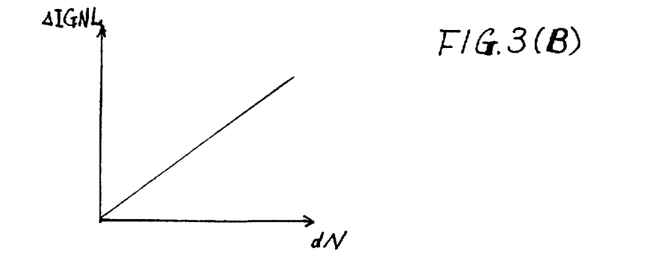

In a step $P_8$, a correction quantity IGNL of the ignition timing according to the dN is loocked up from a characteristic map of dN and $\Delta$IGNL as shown in FIG. 3 (B) previously stored in the ROM 28.

In a step $P_{10}$, CPU 27 determines whether a gear shift position $S_T$ is placed in a first-speed speed range.

Next, in the step $P_{91}$, a correction coefficient $K_N$ of the ignition timing (a first correction coefficient) determined according to the engine revolution speed n with a gear shift position placed in a gear shift range other than the first-speed gear range is looked up from a table map of the engine revolution speed N and correction coefficient $K_N$ shown in FIG. 3 (A).

As the engine revolution speed N is low, an engine torque is high so that the correction quantity becomes large. When the engine revolution speed N is high, the engine torque becomes low and the correction quantity $K_N$ becomes small.

When the gear shift position is placed in the first-speed shift position in the step $P_{10}$, the routine goes to a step $P_{92}$ in which another correction coefficient $K_N$ is read using the engine revolution speed N and the routine subsequently goes to a step $P_{11}$ When the gear shift is placed in a position other than the first-speed gear shift range, the routine goes to a step $P_{12}$ via the step $P_{91}$. Processings of steps $P_{11}$ and $P_{19}$ to $P_{24}$ are executed when the gear shift range is placed in the first-speed range and in the transient operating state. Processings of the steps $P_{12}$ to $P_{18}$ are executed when the gear shift range is placed in a range including and/or exceeding a second-speed gear position and in the transient state.

In steps $P_{11}$ and $P_{12}$, the CPU 27 determines whether the engine 1 falls into the acceleration state or deceleration state from a sign (plus or minus) of the change quantity of the speed dN. If the sign of the change quantity indicates positive, the vehicle is being accelerated. If the sign of the change rate of dN is indicated as negative, the vehicle is being decelerated.

In a step $P_{12}$, the CPU 27 determines that the vehicle is being accelerated and goes to steps $P_{13}$ to $P_{15}$ in which the correction of the ignition timings is carried out according to the engine acceleration state. The CPU determines that the vehicle is being decelerated and goes to steps $P_{16}$ to $P_{18}$ according to the deceleration state, If the shift range indicates the first-speed range with the vehicle accelerated, the routine goes to a step $P_{19}$ and goes to steps $P_{22}$ to $P_{24}$ in which the correction of ignition timings is carried out according to the first-speed range acceleration/deceleration state.

Figure 5:
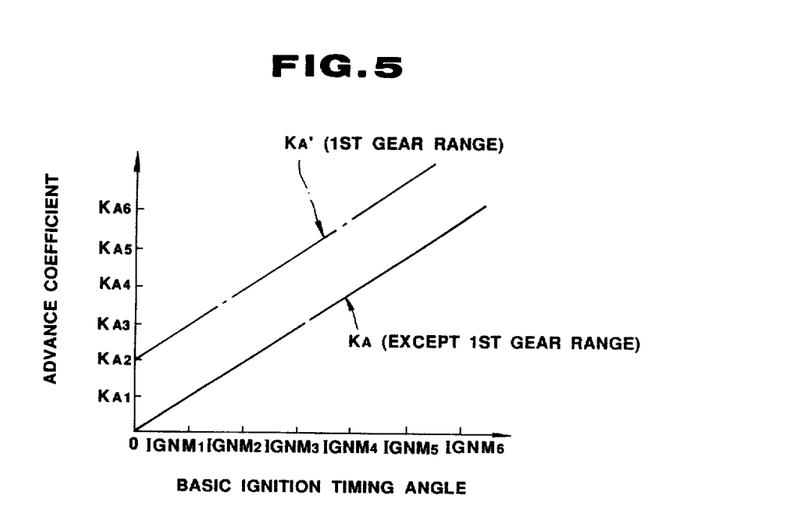
FIG. 5 is a table map for deriving advance coefficients of $K_A$ and $K_{A'}$.

In a step $P_{13}$, a retardation correction coefficient $K_R$ (second correction coefficient) to correct the ignition timing IGN toward a retardation angle side according to the basic ignition timing IGNM read in the step $p_1$ is looked up from a table map shown in FIG. 5. $K_R$ described above is small when the opening angle of the throttle valve $C_V$ is large. That is to say, as $C_V$ is large, the engine torque is small and the shaking vibration quantity is small. Therefore, the correction quantity of the ignition timing IGN may be small. On the other hand, as the $C_V$ is small, the correction quantity of the ignition timing becomes large. Such corrections as described above, the torque variations are suppressed.

In a step $P_{14}$, the correction quantity $\Delta$IGN is calculated in accordance with the following equation (1).

$$\Delta IGN = \Delta IGNL \times K_R \times K_N \quad (1)$$

The final ignition timing IGN is calculated in accordance with the following equation (2) in the step $P_{15}$ and the routine goes to a step $P_{25}$.

$$IGN = IGNM - \Delta IGN \quad (2)$$

An advance coefficient $K_A$ (second correction coefficient) to correct the ignition timing IGN toward an advance angle side according to the basic ignition timing IGNM in the same way as $P_{1y}$ the shift to the second or higher gear range and the deceleration is looked up from a table map as shown in FIG. 6. The tendency of $K_A$ is set in the same way as $K_R$. Torque variation is suppressed in the same way as acceleration.

In a step $P_{17}$, the ignition timing correction quantity $\Delta$IGN is calculated in accordance with the following equation (3).

$$\Delta IGN = \Delta IGNL \times K_A \times K_N \quad (3)$$

In a step $P_{18}$, the final ignition timing IGN is calculated in accordance with the following equation (4) and the routine goes to a step $P_{25}$.

$$IGN = IGNM \times \Delta IGN \quad (4)$$

Figure 4:
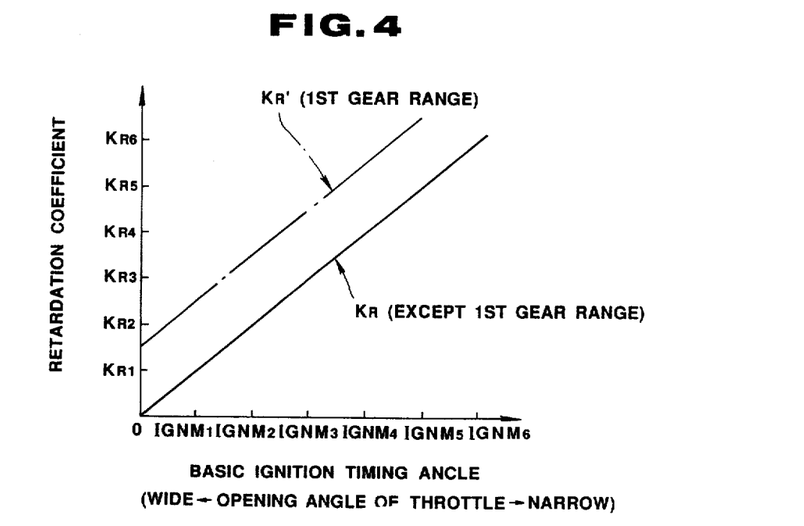
FIG. 4 is a table map for deriving retardation coefficients of $K_R$ and $K_{R'}$.

A retardation coefficient $K_{R'}$ (second correction coefficient) to correct the ignition timing IGN according to the basic ignition timing IGNM read in the step P the acceleration in the first-speed gear shift range is looked up from a table map as shown in FIG. 4.

$K_{R'}$ is set on the same table map as $K_R$. The correction quantity of the basic ignition timing IGNM becomes large compared with that in the case of the gear range being 2nd gear or higher with respect to the basic ignition timing IGNM. That is to say, the following inequality (5) is established.

$$K_R < K_{R'} \quad (5)$$

$K_{R'}$ causes the torque variation to be multiplied according to the the gear ratio while in the first-speed gear range so that vibrations transmitted to the power train are suppressed.

In the step $P_{20}$, the correction quantity $\Delta$IGN of the ignition timing is calculated in accordance with the following equation (6).

$$\Delta IGN = \Delta IGNL \times K_{R'} \times K_{N'} \quad (6)$$

In the step $P_{21}$, the final ignition timing IGN is calculated in accordance with the following equation (7) and the routine goes to a step $P_{25}$.

$$IGN = IGNM - \Delta IGN \quad (7)$$

A correction quantity $K_{N'}$ (first correction quantity) used in the equation (6) is looked up from the table map shown in FIG. 3. The correction quantity $K_{N'}$ is that for the ignition timing IGN according to the revolution speed N set while in the first-speed gear range. The relationship of $K_N$ to $K_{N'}$ is $K_N > K_{N'}$. Since the engine revolution speed N is lower than that while in the second or higher gear shift range, the ignition timing correction quantity may accordingly be reduced.

The advance coefficient $K_{A'}$ correction coefficient) to correct the ignition timing IGN according to the basic ignition timing IGNM toward the advance angle side during the deceleration in the first-speed gear range in the step $P_{22}$ is looked up from the table map shown in FIG. 5.

The correction coefficient $K_{A'}$ is set in the same manner as that of $K_{R'}$ during the acceleration and its relationship to $K_A$ is $K_A < K_{A'}$.

$K_{A'}$ causes torque variation to effectively be suppressed even during the deceleration in the first-speed gear range and the shaking vibrations are also prevented.

Next, in a step $P_{23}$, the correction quantity $\Delta$IGN to correct the basic ignition timing IGNM in accordance with the following equation (8) is calculated.

$$\Delta IGN = \Delta IGNL \times K_{A'} \times K_{N'} \quad (8)$$

The final ignition timing IGN is calculated in accordance with the following equation (9) in a step $P_{24}$ and the routine goes to a step $P_{25}$.

$$IGN = IGNM + \Delta IGN \quad (9)$$

As described above, the correction of the final ignition timing IGN when the engine falls into a transient state during the vehicle movement is not only on the correction coefficient $K_N$ which is set on the basis of the engine revolution speed N but also on the correction coefficients to advance or retard the ignition timing based on the engine load state (in this embodiment, the basic ignition timing IGNM is represented) are set according to the first-speed gear range ($K_{A'}$, $K_{R'}$) and according to one of the gear ranges other than the first-speed gear range ($K_A$, $K_R$). Thus, the revolution variations of the engine are always effectively suppressed so that vibrations transmitted to the power train can accurately be suppressed as well. In addition, when the clutch is disengaged or the shift lever of the transmission is in the neutral range, the correction of the ignition timing is stopped. The final ignition timing IGN is suppressed only by substituting the basic ignition timing IGNM when the correction of the ignition timing is stopped. The response characteristics of the ignition timing control when the vehicle transfers from the stopped state to the running state are improved, giving a favorable impression of engine acceleration performance during the initiation of vehicle acceleration.

Hence, occurrence of the surge and shaking vibrations along with torque variations due to the engine revolution speed variations can be prevented.

In addition, since correction control of ignition timing at a time when the engine throttle valve is opened through the continuous depression of the accelerator pedal with the shift lever placed in the neutral range is not carried out, the engine revolution speed increase is maintained smooth during the transfer of the vehicle from a stopped position to a moving status. Consequently, the engine driveability can be improved.

It is noted that although in the preferred embodiment only the table map on the correction coefficients at the time of the first-speed gear shift range, a high-speed surge occurrence can be avoided if the correction coefficients at the time of four and fifth speed range at which the shaking vibrations rarely become problems are set.

The table maps are constructed through the use of basic ignition timings IGNM which represent the load state of the correction coefficients $K_R$, $K_{R'}$, $K_a$, $K_{a'}$. A table map may also be prepared with the intake air quantity $Q_a$ and opening angle of the throttle valve $C_v$ being set as the parameters.

As described hereinabove, in the ignition timing control system and method according to the present invention, the ignition timing is corrected according to engine load conditions and depending on in which gear range the transmission is placed. When the clutch is disengaged or the shift lever is placed in a neutral range, the correction control of the ignition timing is suspended.

The generation of vibrations which change according to load conditions and gear range together with engine rotational fluctuations at the transient state of the engine can be prevented. A smooth increase in the engine revolution speed during acceleration can be achieved. The performance of the increase in engine revolution speeds can be improved. The engine driveability can consequently be improved.

It will fully be appreciated by those skilled in the art that the forgoing description has been made in terms of the preferred embodiment and various changes and modifications may be made without departing from the scope of the present invention which is to be defined by the appended claims.

What is claimed is:

1. A system for controlling an ignition timing for a vehicular internal combustion engine, comprising:
   (a) first means for detecting engine operating conditions, the first means including second means for detecting engine revolution speed
   (b) third means for detecting any one of gear shift positions of a vehicular power transmission, the gear shift positions including a position at which engine driving force is not transmitted to a vehicular power train;
   (c) fourth means for determining whether the engine falls into a predetermined transient state on the basis of the engine operating conditions;
   (d) fifth means for setting a basic ignition timing angle value according to the detected engine operating conditions;
   (e) sixth means for calculating a first correction coefficient according to engine revolution speed variation when the engine falls into the predetermined transient state, the vehicle in which the engine is mounted is moving;
   (f) seventh means for determining an engine load on the basis of detected engine operating conditions and calculating a second correction coefficient which corrects the ignition timing depending on which of the gear positions in which the shift gear is placed and depending on the engine load;
   (g) eighth means for correcting the basic ignition timing angle value on the basis of the first and second correction coefficients to determine a final ignition timing when the engine is transferred into the predetermined transient state during vehicle movement, the eighth means also halting the correction of the basic ignition timing angle value based on the first and second correction coefficients and determining the basic ignition timing angle as the final ignition timing when the engine does not fall into the predetermined transient state and when the gear shift is placed in a position in which no engine output power is transmitted to the vehicular power train; and
   (h) ninth means for igniting an air-fuel mixture supplied to each engine cylinder at a timing in accordance with the final ignition timing determined by the eighth means.

2. An ignition timing controlling system as set forth in claim 1, wherein the seventh means determines the engine load on the basis of engine operating conditions, the engine load being represented by the basic ignition timing angle value.

3. An ignition timing controlling system as set forth in claim 1, wherein the sixth means derives a change rate (dN) of engine revolution speed from the engine revolution speed detected by the second means, derives a correction quantity ($\Delta IGNL$) from a characteristic map using the rate of change, and derives the first correction coefficient ($K_N$) from the engine revolution speed (N) when the engine falls into an acceleration state, whether the engine falls into an acceleration state being determined on the basis of a rate of change in the engine load.

4. An ignition timing controlling system as set forth in claim 3, wherein the seventh means determines whether the gear shift is placed in a first-speed gear range according to the detected gear positions, determines whether a sign of the change rate (dN) of the engine revolution speed is positive, and calculates the second correction coefficient ($K_R$) from the basic ignition timing angle value in view of the first-speed gear shift range when determining that the gear shift is placed in the first-speed gear range and the rate of change (dN) indicates positive.

5. An ignition timing controlling system as set forth in claim 4, wherein the eighth means calculates the correction quantity $\Delta IGN$) from the following equation:

$\Delta IGN = \Delta IGNL \times K_N \times K_R$ when the gear shift is placed in one of the other ranges except for the first-speed gear shift range and when the sign of the change rate of the engine revolution speed indicates positive, and derives the final ignition timing IGN from the following equation:

IGN = IGNM − $\Delta IGN$, wherein IGNM denotes the basic ignition timing angle value.

6. An ignition timing controlling system as set forth in claim 5, wherein the eighth means calculates the correction quantity IGN) from the following equation:

$\Delta IGN = \Delta IGNL \times K_N \times K_A$, wherein $K_A$ denotes the second correction coefficient determined on the basis of a deceleration state of the engine which is determined when the sign of the change rate of the engine revolution speed indicates negative and when the gear shift is placed in one of the other gear shift ranges except for the first-speed range and derives the final ignition timing (IGN) from the following equation:

$$IGN = IGNM + \Delta IGN.$$

7. An ignition timing controlling system as set forth in claim 6, wherein the eighth means calculates the correction quantity ($\Delta IGN$) from the following equation:

$\Delta IGN = \Delta IGNL \times K_N \times K_{R'}$, when the gear shift is placed in the first-speed gear shift range and when the sign of the change rate (dN) indicates positive, and wherein $K_N$ denotes the first correction coefficient when the gear shift is placed in the first-speed gear shift range and $K_{R'}$ denotes the second correction coefficient when the shift gear range is placed in the first-speed gear shift range and the sign of the rate of change (dN) in the engine revolution speed indicates positive and the eighth means calculates the final ignition timing in the following equation:

$$IGN = IGNM - \Delta IGN.$$

8. An ignition timing controlling system as set forth in claim 7, wherein the eighth means calculates the correction quantity ($\Delta IGN$) from the following equation:

$\Delta IGN = \Delta IGNL \times K_N \times K_{A'}$, when the gear shift is placed in the first-speed gear shift range and when the sign of the change rate (dN) indicates negative, and wherein $K_N$ denotes the first correction coefficient when the gear shift is placed in the first-speed gear shift range and $K_{A'}$ denotes the second correction coefficient when the gear shift is placed in the first-speed gear shift range and the sign of the change rate (dN) of the engine revolution speed indicates negative, and the eighth means also calculates the final ignition timing from the following equation:

IGN = IGNM + $\Delta$IGN.

9. An ignition timing controlling system as set forth in claim 8, wherein $K_N$ is inversely proportional to the engine revolution speed.

10. An ignition timing controlling system as set forth in claim 9, wherein $K_N$ has a negative gradient lower than $K_{N'}$.

11. An ignition timing controlling system as set forth in claim 10, wherein $K_R$ is proportional to the basic ignition timing angle value, $K_R$ being lower than $K_{R'}$.

12. An ignition timing controlling system as set forth in claim 11, wherein $K_A$ is proportional to the basic ignition timing angle value, $K_A$ being lower than $K_{A'}$.

13. A system for controlling an ignition timing for a vehicular internal combustion engine, comprising:
(a) first means for detecting variables representing an operating condition of the engine, the first means including second means for detecting whether the engine falls in a transient state, third means for detecting occurrence of change in an engine revolution speed and change rate of the engine revolution speed, and fourth means for detecting engine load;
(b) fifth means for determining a basic ignition timing on the basis of the variables detected by the first means;
(c) sixth means for determining a first correction quantity to correct the basic ignition timing on the basis of the rate of change in the engine revolution speed;
(d) seventh means for determining a second correction quantity to correct the basic ignition timing on the basis of the engine load;
(e) eighth means for determining a final ignition timing on the basis of the basic ignition timing and/or first-speed and second correction quantities when the third means detects the occurrence of the change in the engine revolution speed;
(f) ninth means for detecting gear shift positions in a vehicular power transmission, the gear shift positions including a position in which no engine driving force is transmitted to a vehicular power train;
(g) tenth means for enabling and disabling the operations of the sixth and seventh means according to the gear shift range position of the vehicle; and
(h) eleventh means for igniting an air-fuel mixture in each engine cylinder at a timing determined by the eighth means.

14. An ignition timing controlling system as set forth in claim 13, wherein when the ninth means detects that the gear shift falls in a first-speed gear range and the engine load is relatively low, the final ignition timing value becomes relatively high.

15. An ignition timing controlling system as set forth in claim 14, wherein the gear shift is placed in a neutral position or clutch of the power transmission is disengaged, with the occurrence of the change in the engine revolution speed, the tenth means disables the operations of the sixth and seventh means.

16. An ignition timing controlling system as set forth in claim 15, wherein the fourth means detects the basic ignition timing as the engine load.

17. An ignition timing controlling system as set forth in claim 15, wherein the fourth means detects an operating variable of an engine driving force adjusting mechanism as the engine load.

18. An ignition timing controlling system as set forth in claim 17, wherein the fourth means detects an opening angle of an engine throttle valve installed in the engine as the operating variable.

19. An ignition timing controlling system as set forth in claim 15, wherein the third means detects the occurrence of change in the engine revolution speed from a rate of change in a fuel injection pulsewidth supplied to an injection valve installed in each intake air passage of the engine.

20. A method for controlling an ignition timing for a vehicular internal combustion engine, comprising the steps of:
(a) detecting an engine revolution speed;
(b) detecting a fuel injection pulsewidth supplied to a fuel injection valve installed in an intake air passage of the engine;
(c) determining a basic ignition timing on the basis of the fuel injection pulsewidth and engine revolution speed;
(d) detecting occurrence of a change in the engine revolution speed and rate of change in the engine revolution speed;
(e) detecting engine load;
(f) determining a first correction quantity to correct the basic ignition timing on the basis of the rate of change in the engine revolution speed;
(g) determining a second correction quantity to correct the basic ignition timing on the basis of the engine load;

(h) determining a final ignition timing on the basis of the basic ignition timing and/or first-speed and second correction quantities;
(i) detecting any one of gear shift positions of a vehicular power transmission, the gear shift positions including a position in which no engine driving force is transmitted to a vehicular power train;
(j) changing the first and second correction quantities according to the gear shift position and disabling the operations in the steps f) and g) so that the final ignition timing is the basic ignition timing when the gear shift is placed in the position in which no engine driving force is transmitted to the power train; and
(k) igniting an air-fuel mixture supplied to each engine cylinder at a timing of the final ignition timing.

* * * * *